United States Patent [19]

Sikorski

[11] Patent Number: 5,233,021

[45] Date of Patent: Aug. 3, 1993

[54] RECYCLING OF POLYMERIC MATERIALS FROM CARPETS AND OTHER MULTI-COMPONENT STRUCTURES BY MEANS OF SUPERCRITICAL FLUID EXTRACTION

[75] Inventor: Mathew E. Sikorski, Atlanta, Ga.

[73] Assignee: Georgia Tech Research Corporation, Atlanta, Ga.

[21] Appl. No.: 882,274

[22] Filed: May 13, 1992

[51] Int. Cl.$^5$ .............................................. C08F 6/00
[52] U.S. Cl. .................................. 528/491; 528/501; 528/502; 523/332; 523/340; 203/49; 264/101; 159/2.2; 210/774
[58] Field of Search ............... 523/340, 332; 528/491, 528/497, 501, 502; 203/49; 264/101; 159/2.2; 210/774

[56] References Cited

U.S. PATENT DOCUMENTS 4,714,526 12/1987 Pennisi et al. .......................... 203/49
5,080,845 1/1992 Herrmann et al. ................... 159/2.2
5,126,058 6/1992 Beckman ................................ 210/774

OTHER PUBLICATIONS

McCrum, N. G. et al., "Principles of Polymer Engineering," *Oxford Science Publications*, 1988, pp. 44–45.

Primary Examiner—Paul R. Michl
Assistant Examiner—LaVonda DeWitt
Attorney, Agent, or Firm—Hopkins & Thomas

[57] ABSTRACT

A method of extracting pure components from a multi-component structure by dissolving each component at an appropriate temperature and pressure in a supercritical fluid and then varying the temperature and/or pressure to extract particular components in sequence.

16 Claims, 2 Drawing Sheets

SOLUBILITY ISOTHERMS FOR POLYPROPYLENE IN CARBON DIOXIDE, PLOTS OF $CO_2$ PRESSURES VERSUS WEIGHT FRACTIONS POLYPROPYLENE AT CONSTANT TEMPERATURES.

RECYCLING OF POLYMERIC MATERIALS FROM CARPETS AND OTHER MULTI-COMPONENT STRUCTURES BY MEANS OF SUPERCRITICAL FLUID EXTRACTION

FIELD OF THE INVENTION

The present invention relates in general to the extraction of pure components from multi-component structures. More particularly, the present invention relates to a method of recovering polymeric materials from multi-component structures such as carpets, disposable diapers, etc., utilizing supercritical fluids in which the polymeric materials are dissolved at different temperatures and/or pressures to enable separation and extraction of pure polymeric materials from the multi-component structures.

BACKGROUND OF THE INVENTION

The carpet industry in the United States is an estimated fourteen billion dollar a year industry. It is estimated that over 1.3 billion square yards of carpeting are produced and sold annually. Approximately one-half of the sales of this carpeting per year is in the replacement market, for replacement of old or worn carpeting, primarily in the area of institutional use. Statistics show that approximately 2.4 billion pounds of polymer face fibers, such as nylon, polyester, or polypropylene materials, are used in the manufacturing of carpet in the United States every year.

However, with this large scale production of new carpet and the replacement of old or worn carpeting comes a large amount of waste. Carpet waste is estimated at over one billion pounds per year. Most of this waste carpet material is disposed of in landfills throughout the United States. Existing landfills are rapidly becoming full, new landfill space is at a premium, and the cost of disposal of waste materials is rising rapidly as a result. Additionally, the polymer fibers currently being used in carpeting and discarded as waste present a serious environmental concern since such polymer materials do not readily degrade or break down. Thus, conventional disposal of such materials is simply a net loss.

There are great potential savings both financially and environmentally to be realized from the recovery and recycling of waste polymer fibers used in the production of carpeting. Recycling would save millions of dollars per year by eliminating the cost of waste management and disposal of carpeting and waste materials from the manufacture of carpeting in landfills. Additionally, use of recycled materials will result in lower cost for the manufacture of the carpeting, will greatly reduce the use of virgin raw materials, and will significantly reduce or eliminate the environmental impact of the disposal of such polymeric materials.

Recently, extraction methods have been developed for the separation of materials, such as polymeric materials from multi-component systems and for the removal of impurities from polymeric plastic materials by introducing an extraction gas in a supercritical state to dissolve and or remove the specific materials or impurities. For example, U.S. Pat. No. 4,714,526 of Pennisi et al and U.S. Pat. No. 5,080,845 of Hermann et al show methods of supercritical fluid extraction for extracting pure components or impurities from multi-component mixtures of materials. The components are dissolved in a supercritical fluid to form a solution. The solution is then drawn off, removing the desired component from the remaining component mixture. Such methods, as disclosed in Pennisi et al have not been applied to the recovery and recycling of polymeric materials such as carpeting materials. Indeed, the method disclosed by Pennisi et al appears to be ill suited for use in recycling and recovering polymeric materials.

Pennisi et al discloses an extraction method wherein all of the components of the mixture are dissolved into the supercritical solution at the same time. Thus, Pennisi et al requires that the temperature of the supercritical solution be high enough for all of the components to be dissolved simultaneously. In the case of the recovery of polymers from carpets, it is not practical or desirable to subject all of the components of the carpeting material to the highest temperature necessary to solubilize the component with the highest melting point. Such high temperatures can cause thermal damage to polymer molecules, for example by converting polymers to monomers, thereby rendering the polymeric material unfit for recycling and reuse in the desired manner of the present invention.

Accordingly, all the polymeric materials should be recovered at their lowest possible temperature in order to avoid such thermal damage. Most of the different polymeric materials used in the makeup of carpeting have different temperatures at which these polymeric materials dissolve in supercritical fluids. For example, to recover polyester, the temperature of the supercritical solution must be about 100° C. higher than that required for dissolving polypropylene. Accordingly, the extraction method of using a supercritical fluid at extremely high temperatures to dissolve out and extract a component from a multi-component material as taught by Pennisi et al would be ill suited for use in the recovery and recycling of polymeric materials from carpeting or other structures.

Therefore, it is seen that a need exists for a method of recovering and recycling polymeric material from waste carpeting, carpeting materials, and like structures that enables a substantially complete recovery of all of the different polymeric materials without risking damage to the polymers and rendering them unfit for reuse in the production of new carpeting or other products made from such materials.

SUMMARY OF THE INVENTION

Briefly described, the present invention comprises a method of extraction of polymeric materials from a multi-component product such as carpeting, disposable diapers, and other structures. The polymeric material structure is initially contained within a first enclosed chamber or extraction vessel. Each polymeric material component of the mixture has a different range of temperatures and pressures at which it is soluble in a given supercritical fluid. A suitable fluid is introduced into the extraction vessel. The temperature and pressure are adjusted so that the fluid becomes supercritical in order to solubilize the component having the lowest range of solubility temperatures and pressures. This component is dissolved into the supercritical fluid, separating the component from the remaining polymeric materials present in the extraction vessel. The supercritical polymer-containing solution is drawn out of the extraction vessel and into a second enclosed chamber or extract collection vessel. The temperature and/or the pressure of the supercritical fluid is reduced in the extract collection vessel to allow the desired component to be extracted in a pure form. Thereafter, the solvent fluid is drawn off and the pure polymeric component material is collected for recycling.

Accordingly, it is an object of this invention to provide a method for recovering polymeric materials in an essentially pure form.

Another object of this invention is to provide a method for separating and extracting polymeric materials for recovery and reuse from a structure containing multiple polymeric materials for recovery and reuse.

A further object of this invention is to provide an economical and safe method of converting carpet waste into carpeting precursor materials.

A still further object of this invention is to provide a method of supercritical fluid extraction of polymeric materials by dissolving polymeric materials in a supercritical fluid and thereafter extracting the pure polymeric material from the supercritical fluid in sequence by appropriately varying either the temperature, the pressure, or both, of the supercritical fluid to recover all pure polymeric materials.

A still further object is to extract the polymeric materials by providing appropriate experimental conditions to collect the recovered materials in form of molded structures, films, or fibers.

Other objects, features, and advantages of the present invention will become apparent from the following detailed description which makes reference to the accompanying drawings.

DETAILED DESCRIPTION OF THE PREFERRED EMBODIMENT

Figure 1:
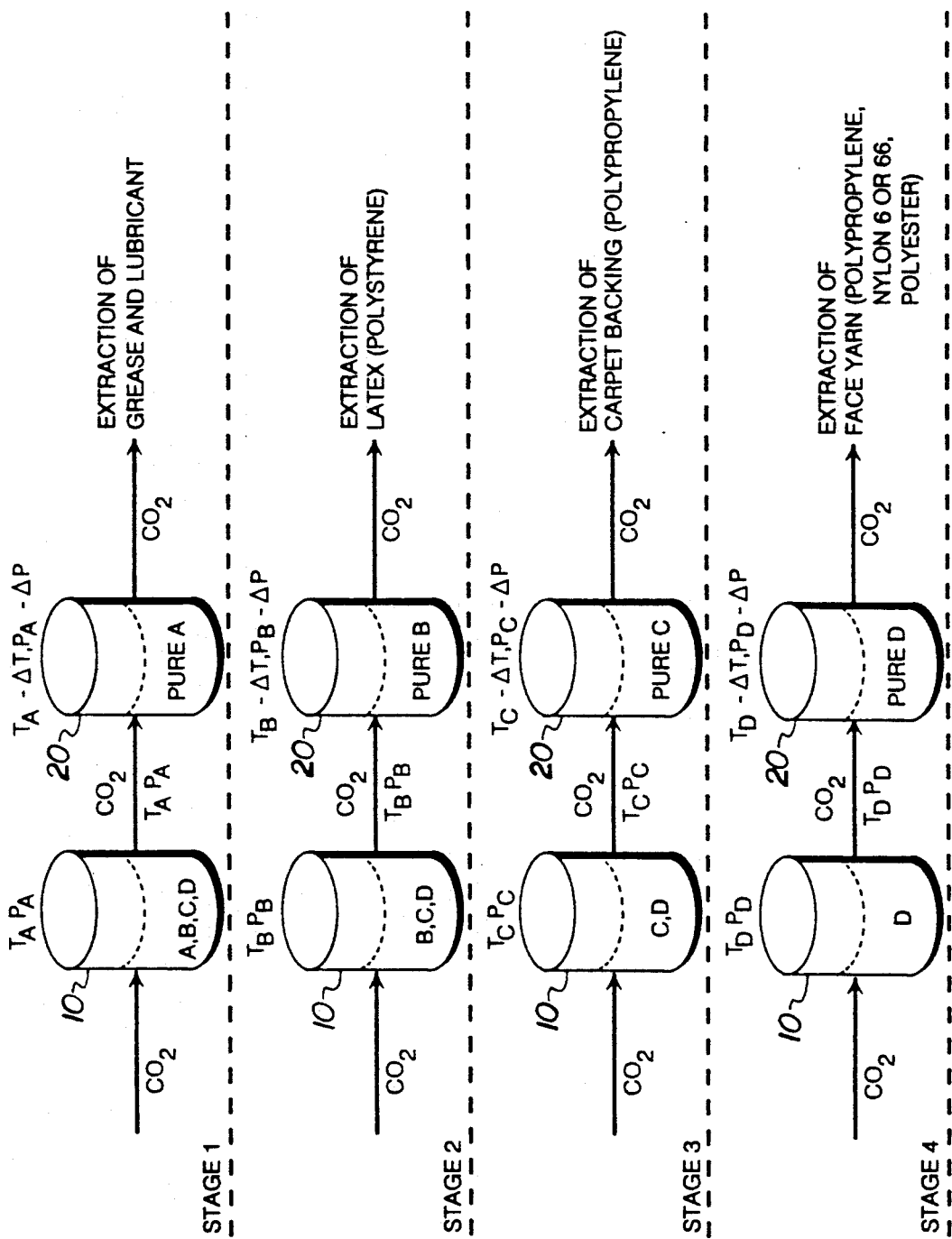
FIG. 1 is a flow chart showing the sequence of stages by which the various components of carpet are separated and extracted for recovery.

The present invention comprises the utilization of supercritical fluid phenomena and the use of supercritical fluid extraction techniques for the recovery of polymeric materials. Either batch or continuous process techniques are applicable. The polymeric materials are recovered as reconstituted materials that can be used as a new process feed stock for a variety of applications. In addition to the recovery of waste materials generated during the manufacture of new carpets, such as lint, soft goods, and selvage trim, including latex, polymeric materials from used or discarded carpets can be recovered as well.

Carpeting is typically composed of a number of components, each normally being a polymeric material. These components include primary and secondary backing layers, usually formed from polypropylene, face yarn that is composed of nylon, polypropylene, or polyester fibers, and a latex binder material that is used to bind the primary and secondary backing layers together and to bind the face yarn to the primary backing of the carpet. The outer edges of the primary and secondary backing layers comprise the selvage of the carpet by which the carpet is propelled during the manufacture thereof. After the carpet is made, the selvage is usually separated from the carpeting and discarded or sold. This normally constitutes the largest percentage of waste generated during the manufacture of new carpets.

Conventionally, the extrusion of polymers is carried out at temperatures substantially above the softening or melting points of the polymers in order to lower their viscosities into workable ranges. Gaseous solutions of polymers are attractive as transport and fabrication media since they can be manipulated at substantially lower temperatures than polymer solutions in traditional fiber melt-spinning processes. The polymers generally used for the components of carpeting are soluble in a supercritical fluid or dense gas at temperatures in the vicinity of their melting temperatures. For example, polystyrene can be dissolved in carbon dioxide ($CO_2$) and ethane at or above 100° C. at suitable pressures.

A supercritical gas is a fluid that is raised above its critical temperature and pressure. Unlike the continuous line in the phase diagram between the solid and liquid phases, the line between liquid and gas has a terminus point. This terminus point is the critical point at critical temperature and pressure beyond which lies the supercritical region. In this supercritical region, supercritical fluid acts chemically like a liquid and physically like a gas. Its viscosity resembles that of a dense gas, which gives the fluid the ability to readily penetrate a polymer matrix. Accordingly, supercritical gases are better solvents than their corresponding liquids because of the lower viscosity of dense gases and the rapid heat and mass transfer possible in supercritical gaseous solutions.

The present invention teaches the utilization of supercritical phenomena for the separation of different carpet components. A particular extracted component can be used in fabrication processes such as molding or spinning of polymeric fibers at high speed directly from the supercritical gas. Spinning speeds would be greater as compared with conventional melt-spinning because of much lower viscosity of material dissolved in a supercritical fluid. Purification of polymeric materials, utilizing the supercritical process, constitutes another possible application of recovery of polymeric waste materials by this method, rendering the properties of recovered polymers to be similar to those of virgin materials.

Among the gases known to be useful as solvents for supercritical application are gases such as carbon dioxide ($CO_2$), ethane, and n-Butane. Carbon dioxide as a supercritical gas is generally preferred for the present invention; however, in some cases a gas mixture will be most efficient. It will be understood by those skilled in the art that other gases in a supercritical state can be utilized in which polymeric material can be readily dissolved.

Referring now to the drawings, FIG. 1 illustrates a multi-stage process whereby all of the carpet components can be recovered in sequence by varying the temperatures and/or pressures in the supercritical extraction apparatus for each separate component which can be recovered for recycling. As schematically illustrated in FIG. 1, the supercritical extraction apparatus includes an enclosed chamber such as an extraction vessel 10 and an enclosed extract collection vessel or separation chamber 20. The extraction vessel 10 includes the undissolved carpet waste material which is reactive with a supercritical gas therein. The vessel may contain mixing or agitating means (not shown) for exposing substantially all of the surface area of the material to increase the permeability of the material and to reduce the length of time required for the operation.

At stage 1 of the process, the extraction vessel 10 includes, for example, four carpet components labeled A, B, C, and D. The letter A corresponds to oil and grease or other lubricants which may be deposited onto or absorbed by the carpet selvage during the manufacture of the carpeting. Component B refers to the latex binder commonly known as SBR or styrene/butadiene rubber, used to adhere the primary and secondary backing layers together and to adhere the face yarn to the primary backing. Component C refers to the polypropylene primary and secondary backing layers of the carpeting, and component D refers to the face yarn, which can be polypropylene, nylon 6 or 66, polyester, or a blend of polymeric materials.

As FIG. 1 illustrates, at stage 1 of the process, all four of the components A, B, C, and D are contained within the extraction vessel 10. The carrier fluid, $CO_2$, is introduced into the extraction vessel, as indicated. In the vessel the fluid is in a supercritical state at a temperature and pressure denoted by $T_A$ and $P_A$. $T_A$ is the supercritical temperature and T, is the supercritical pressure, sufficient to cause the component A to dissolve in the supercritical $CO_2$ without materially or physically affecting the remaining polymeric carpet components. This enables component A to be extracted as a component of a solution, in combination with the supercritical $CO_2$, and apart from the remaining carpet components B, C, and D. A restrictor valve is then opened in a batch-type operation to enable the supercritical gas, with the component A dissolved therein, to be drawn out of the extraction chamber 10. The supercritical gas and component solution are transferred to the extract collection vessel 20.

In the extract collection vessel, either the temperature, the pressure, or both are reduced to below the supercritical values required for the dissolving of the A component into the supercritical $CO_2$. The reduction of both temperature and pressure is indicated by $T_A - \Delta T$ and $P_A - \Delta P$ in FIG. 1. The lowering of the temperature and pressure causes the A component to be extracted out of the supercritical $CO_2$. The $CO_2$ is then released from the extract collection vessel and routed to a pump or compressor (not shown) for reentry into the extraction vessel. Thereafter, the solvent fluid is filtered and pumped back into the extraction vessel. The collected A component is removed from the extract collection vessel such as through a control valve and is recovered.

At stage 2, the supercritical $CO_2$ is reintroduced into the extraction vessel 10 and the temperature and pressure are raised to a temperature $T_B$ and pressure $P_B$. $T_B$ is the supercritical temperature and $P_B$ is the supercritical pressure sufficient for the B component to be dissolved in the supercritical fluid. The B component, which is the latex binder, has the next lowest supercritical temperature and pressure, relative to the grease, oil, etc. At stage 2, the B component minus any fillers such as calcium carbonate is dissolved into the supercritical $CO_2$ in the pressure vessel. As in stage 1, the solute-laden $CO_2$ is then drawn out of the extraction vessel through the valve into the extract collection vessel 20 where it is cooled and/or depressurized, as indicated by $T_B - \Delta T$ and $P_B - \Delta P$. At this point, the separation of the pure component B from the $CO_2$ occurs. The pure B components of latex are collected in the separation vessel and the solvent fluid is exhausted from the extract collection chamber. Thereafter, the pure component B is removed from the separation vessel.

The process is repeated for stages 3 and 4 with the supercritical $CO_2$ (in gas phase) being reintroduced into the extraction chamber 10 or with the $CO_2$ being later raised to supercritical temperatures and pressures. The supercritical values are denoted by $T_c$ and $P_c$ and $T_D$ and $P_D$ and are selected from experimentally determined values to dissolve in sequential order the different polymeric materials having successively higher temperatures and pressures.

The solute-laden supercritical fluid is drawn off into the extract collection chamber 20, and the temperature and/or pressure of the solution are decreased to extract the C and D components in purified form. At stage 4, the process can be repeated as necessary to separate and extract the nylon, polyester, and polypropylene materials used for the face yarn fibers where, normally, only one type of face yarn material is present, i.e., nylon, polyester, or polypropylene.

Figure 2:
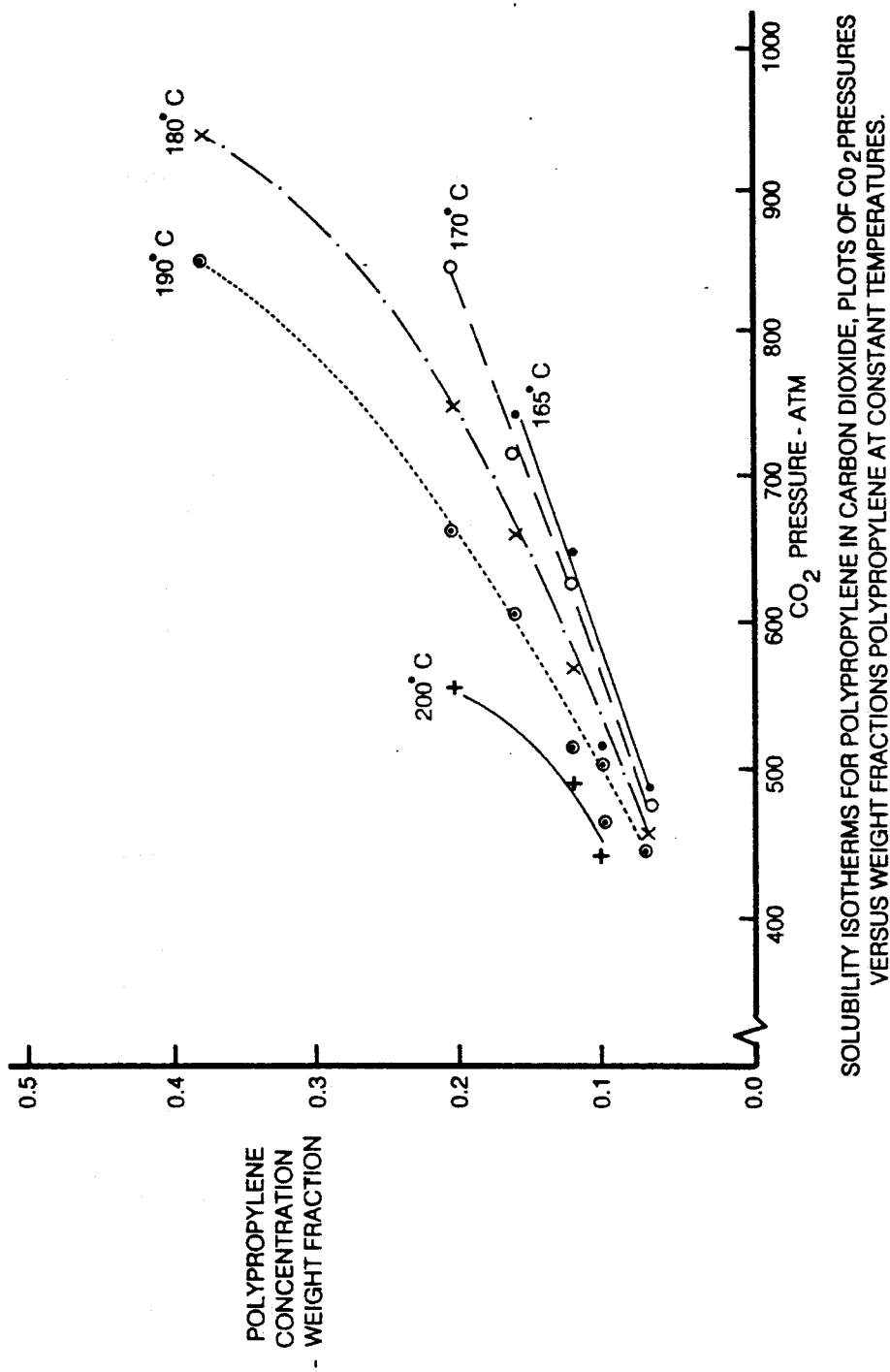
FIG. 2 is a plot of the solubility isotherms for polypropylene in carbon dioxide based upon $CO_2$ pressures vs. weight fractions of polypropylene.

Of practical importance is the fact that when the pressure and temperature, or both, are reduced to below the optimal solubility isotherm, an example of which is shown in FIG. 2 for polypropylene, the extracted polymer comes out of the gaseous solution in the form of substantially pure lubricant, latex components, including calcium carbonate, normally added during the formulation of the latex composition, polypropylene, polyester, etc. The extracted material takes a shape conforming to that of the pressure vessel in which it is contained. Once recovered, the various pure components can be reprocessed as required and reused to produce new carpet. The recovered solid polymeric material can be easily pelletized for use in conventional molding and fiber spinning equipment. On the other hand, a component may be recovered in the form of microfibers through a specially designed spinnerette directly from the supercritical solution, or the material may be injected into a mold, sprayed onto a moving belt to form a film, etc. Nozzles used for such approaches are designed with adjustable pressure and temperature profile capabilities.

Variation or control of both temperature and pressure can be used to control the recovery of the dissolved polymeric material for whatever the application. The process of extraction of the polymeric material from solution in the supercritical fluid used as a solvent. The supercritical fluid used is normally accomplished by reducing the temperature or pressure of the supercritical solution or both. Accordingly, the magnitude of temperature or pressure change necessary for the extraction can be relatively small. This feature is particularly useful for a recirculating fluid system, since little energy is required to restore the supercritical conditions for operation.

Additionally, the solubility conditions for various materials such as polypropylene or polyester vary depending upon the supercritical fluid used as a solvent. The supercritical fluid used ordinarily is as pure as possible; however, small amounts of impurities can be present in the supercritical fluid without materially affecting the present method. The choice of the fluid solvent for a specific application is generally dictated by the relative cost of the gas and safety precautions associated with its use. Both ethane and n-Butane are flammable and more expensive than carbon dioxide. Carbon dioxide is therefore the preferred gaseous medium due to its low cost, easy availability, chemical inertness, lack of toxicity and greater safety in use. It should also be noted, however, that combinations of suitable gases, i.e. $CO_2$ and n-Butane in selected proportions may be most efficient and/or economical for extracting certain components.

Table 1 shows system parameters for a supercritical solution of some common carpet components.

TABLE 1

| System | Weight Fraction Polymer | Pressure atm | Temp. Deg. C. |
|---|---|---|---|
| Carbon Dioxide-polystyrene | .02–.06 | 666–688 | 100–144 |
| Ethane-polystyrene | .07–.41 | 187–382 | 100–201 |
| n-Butane-polystyrene | .13–.29 | 88–123 | 155–201 |
| Carbon Dioxide polypropylene | .07–.40 | 450–954 | 163–208 |
| Ethane-polypropylene | .04–.41 | 307–415 | 160–200 |
| n-Butane-polypropylene | .05–.20 | 130–190 | 166–186 |
| Carbon Dioxide-nylon-6 | .14–.17 | 400–510 | 233–241 |

This table illustrates a means by which sequential separation of a multi-component article or product such as carpet can be accomplished.

FIG. 2 illustrates an example of experimental results for the solubility isotherms for fiber quality polypropylene and carbon dioxide. It can be seen that for a given temperature, the amount of dissolved polymer is a function of applied pressure only. Similarly, for a fixed pressure, the temperature is the controlling factor for the amount of polymer dissolved.

For example, in order to increase the polypropylene concentration from approximately 10 to 20% at a constant temperature of 180° C., the pressure must be increased by approximately 200 Atmospheres (ATMs) of pressure or 2,940 pounds per square inch (psi). Accordingly, for each 1% increase in concentration of polypropylene dissolved into solution, an increase in pressure of approximately 20 ATMs or 294 psi is required. Alternatively, the same increase in polymer concentration can be achieved at a constant pressure. For example, at a constant pressure of 600 ATMs, to increase the concentration of polypropylene from 10 to 20% would require an increase in temperature from approximately 165° C. to approximately 197.5° C. Thus, an increase of 32.5° C. is required to raise the concentration by 10%, which corresponds to a 1% rise in concentration for each increase of the temperature by 3.25° C.

For the sake of automation of the supercritical extraction process and the possibility of applying closed-loop controls, several approaches are possible for the electronic detection of the onset of supercritical conditions inside the reaction chamber. For example, the system can be based on the use of a laser, on the application of ultrasound in the C-scan mode, or on the analysis of acoustic emission detected during the change of phase from liquid to gas when supercritical conditions are reached. Another viable alternative is the use of a flow meter. Once favorable conditions have been determined, the process control systems can be easily programmed, monitored, and/or adjusted.

In addition to the removal of impurities such as oil or other lubricants and the extraction of the individual components, the present invention may also be used for the extraction of dye from carpeting or other products. The extraction is carried out in the same manner as described above for any other component. Naturally, the procedure could also be reversed, with dye being introduced into a polymeric material, depending on the end use of the polymer. Extraction of dye from carpeting can increase the value of the recovered material, particularly where the recovered material is to be used as a precursor for new carpet production.

It will be understood by those skilled in the art that while the present method has been disclosed according to a preferred embodiment of the invention, variations and modifications can be made to the described method without departing from the spirit and scope of the invention as set forth in the following claims.

I claim:

1. A method of extracting pure polymeric components from a multi-component polymeric textile structure in which said components have different melting temperatures and temperature ranges, for recovery of each individual polymer component, comprising the steps of:

(a) introducing a supercritical fluid into a first enclosed chamber, with the first chamber having the multi-component polymeric textile structure contained therein;

(b) adjusting the temperature and pressure within the first chamber to a temperature and pressure range sufficient to cause a first component of the multi-component structure to solubilize in the supercritical fluid, said first component having a solubilization range below the remaining components;

(c) passing the supercritical fluid with the solubilized component in solution therein into a second enclosed chamber;

(d) varying the temperature and/or pressure of the solution to separate the solubilized pure component from the supercritical fluid;

(e) removing the solvent fluid from the second chamber; and (f) repeating steps (a) through (e) for extracting the components singularly and in sequence, proceeding from said first component through the additional components, the sequence proceeding from the component with the lowest melting temperature to the highest melting temperature until each individual component has been extracted from the multi-component structure.

2. The method of claim 1 and further including the step of removing the pure component from the second chamber in solid form.

3. The method of claim 2 and further including the step of reducing the temperature and pressure to below supercritical values for the supercritical fluid to separate the pure component from the supercritical fluid in solid form.

4. The method of claim 1 in which the supercritical fluid is selected from the group consisting of hydrocarbons and inorganic compounds.

5. The method of claim 1 in which the supercritical fluid is selected from the group consisting of carbon dioxide, ethane, n-Butane, pentane, other hydrocarbons, and mixtures of said fluids.

6. The method of claim 1 and further including the step of recirculating the solvent fluid from the second chamber to the first chamber.

7. A method of separating pure polymer components from a multi-component polymeric textile material such as carpet wherein each component has a different range of temperatures and pressures at which the component is soluble in a supercritical fluid, comprising the steps of:
   (a) introducing the solvent fluid into an extraction vessel containing the multi-component material at a temperature and pressure sufficient to cause the solvent fluid to enter a supercritical state to solubilize the component having the lowest range of solutility temperatures;
   (b) passing the supercritical fluid with said lowest range component in solution therewith from the extraction chamber to an extract collection chamber;
   (c) varying the temperature and/or pressure of the supercritical solution to extract pure component from the supercritical fluid;
   (d) removing the solvent fluid from the extract collection chamber; and
   (e) repeating steps (a)-(d) until each component in the structure has been separated into pure form, proceeding in sequence from the component having the lowest melting temperature to the component having the highest melting temperature.

8. The method of claim 7 and further including the step of recirculating the solvent fluid from the second chamber to the first chamber.

9. The method of claim 7 in which the supercritical fluid is selected from the group consisting of hydrocarbons and inorganic compounds.

10. The method of claim 7 and further including the step of recovering the pure component in a substantially solid form.

11. The method of claim 7 including the additional step of spinning polymeric fibers directly from the extraction chamber under supercritical conditions via a spinnerette with adjustable pressure and temperature profiles.

12. The method of claim 7 including the additional step of injecting supercritical polymeric fluid through a nozzle into a mold, the nozzle having adjustable pressure and temperature profiles.

13. The method of claim 7 including the additional step of forming a polymeric film by allowing the supercritical polymeric solution to escape the extraction chamber through an appropriately designed nozzle with adjustable pressure and temperature profiles onto a rotating drum.

14. The method of claim 7 including the additional step of removing dye from any of the components utilizing steps (a)-(d).

15. The method of claim 7 and further including elevating the temperature and pressure of the supercritical fluid to a range sufficient to solubilize the component with the next lowest range of solubility temperatures and pressures.

16. The method of claim 7 and wherein the step of recovering the component comprises the step of reducing the temperature and pressure to below supercritical values for the supercritical fluid to separate the pure component in solid form from the supercritical fluid.

* * * * *